United States Patent [19]

Hinkes

[11] 3,950,891
[45] Apr. 20, 1976

[54] SEED COATING COMPOSITION AND COATED SEED

[75] Inventor: Thomas M. Hinkes, Madison, Wis.

[73] Assignee: Florida Celery Exchange, Orlando, Fla.

[22] Filed: Jan. 3, 1975

[21] Appl. No.: 538,246

[52] U.S. Cl. ................................. 47/57.6; 428/15; 428/403; 428/913; 106/287 S
[51] Int. Cl.² .......................................... A01C 1/06
[58] Field of Search .................. 161/19, 21; 156/57, 156/61; 106/287 S; 47/57.6; 428/15, 17, 403, 913

[56] References Cited
UNITED STATES PATENTS

| | | | |
|---|---|---|---|
| 2,579,735 | 12/1951 | Burgesser | 47/57.6 X |
| 2,649,388 | 8/1953 | Wills et al | 106/287 S |

FOREIGN PATENTS OR APPLICATIONS

| | | | |
|---|---|---|---|
| 572,311 | 10/1945 | United Kingdom | 47/57.6 |
| 833,180 | 4/1960 | United Kingdom | 47/57.6 |

*Primary Examiner*—George F. Lesmes
*Assistant Examiner*—Henry F. Epstein
*Attorney, Agent, or Firm*—Mason, Fenwick & Lawrence

[57] ABSTRACT

A seed coated with an inorganic coating material which opens to expose the underlying seed when subjected to moisture, the coating composition comprising at least 50% by weight of an amorphous silica, the remainder including at least about 5% by weight montmorillonite and at least about 10% by weight attapulgite, is disclosed. Celery seed when treated according to the present invention has been found to compare favorably with raw seed with regard to germination characteristics and the like.

11 Claims, No Drawings

3,950,891

SEED COATING COMPOSITION AND COATED SEED

BACKGROUND OF THE INVENTION

1. Field of the Invention

This invention relates generally to the treatment of small seeds and is more particularly directed to a method for handling small seeds for planting, coated seeds, and the coating composition employed.

2. Description of the Prior Art

In the modern practice of agriculture, it is economically essential that the manual labor requirements for planting, cultivating, and harvesting a crop be kept to a minimum. Present methods for growing celery are costly. Celery seed is very small and is therefore difficult to handle and to plant with any degree of precision. There are approximately 70,000 seeds to the ounce. The seeds are approximately 1.0 × 1.8 millimeters in size with longitudinal ribs pointed on each extremity. The celery seeds are planted in seed beds and the resulting seedlings permitted to develop for approximately 12 weeks. Two to three ounces of celery seed are planted in open seed beds, having dimensions of about 4 ft. wide × 300 ft. long. This seeding produces a plant population of about 120,000 plants, there being a large variation in the size of the individual plants due to the varying germination rates. The seed bed mentioned can generally supply plants to cover one to two acres, as approximately 40,000 plants are required to plant an acre with the celery planted 6 to 8 inches apart in rows spaced about 24 inches. The seedlings are then transplanted to the field where, in about 90 days, they reach maturity.

As will be appreciated, the various handling steps to and from the seedbed are a costly and somewhat difficult operation which require a substantial amount of manual labor. Hence, there exists a need to reduce the labor content by mechanization of the handling and the transplanting phase of celery production.

It should also be mentioned that attempts have been made to directly plant celery seed in the field without going through a transplanting operation. However, this technique has not always been successful.

SUMMARY OF THE INVENTION

The present invention is directed to an improved coating composition for preparing small seeds for planting and to the coated or pelletized seeds. Further, the present invention permits utilization of mechanized equipment for many of the operations formerly carried out manually. In order to handle the plants mechanically it is necessary that the individual plants germinate and grow to maturity at a substantially uniform rate. While it has been known that seed could be pelletized and the pelletized seed handled by mechanical planters, the operation has not been successful with all seeds. For example, the compositions can adversely affect the germination of the seeds. Also, seeds of different plants require different conditions for germination among which may be included adequate water, suitable temperature, sufficient oxygen, etc. However, certain seeds, such as celery, additionally require light for germination. For such seed the requirement of light for germination renders conventional coating compositions unsatisfactory because such materials inherently prevent light from reaching the seeds.

It should be appreciated that the present invention is generally applicable to most small seeds which require light for germination, particularly seeds of the Umbelliferae family, e.g., parsley, carrot, celery. It is especially useful for celery (Apium graveolens) seeds.

The coating composition of the present invention, when applied to celery seeds, yields uniform pellets of substantially spherical shape which can be stored for a period of several months or more. The coating composition of this invention is formulated having a pH value which will not interfere with seed germination and which, when exposed to water (as when the seed is planted) opens and breaks away from the seed, thereby permitting light to penetrate therein.

OBJECTS OF THE INVENTION

It is therefore an object of this invention to provide a seed coating composition, a pelletized seed, and a method of planting small seeds, all of which permits the utilization of mechanized equipment for producing celery and the like.

Another object of this invention is to provide a coating composition which will preserve the seeds initially and which will enable the seeds to be planted mechanically at precisely spaced intervals either directly in a field row or in the individual cells of a multi-cell container.

Still another object of the invention is to provide a coating composition which will not adversely affect the seed germination, when compared to raw seeds, by delaying germination, reducing plant vigor, or decreasing the percentage germination.

A further object of the invention is to provide a seed coating composition which does not hinder the water absorption characteristics of the seeds.

A still further object of the invention is to provide a seed coating composition which, when planted and exposed to water, opens or "flowers" permitting entry of light in a short time after planting.

This invention has as a further object the production of a seed coating composition which when in use yields seeds having substantially the same time of germination and the same percentage of germination as raw uncoated seeds.

These and other objects of the present invention are attained by the utilization of a mixture of inorganic materials having different moisture absorption characteristics and swelling rates to stress the coating sufficiently to fracture it when the dried coating is subjected to moisture.

DETAILED DESCRIPTION OF THE INVENTION

Investigations covering many combinations of coating materials were carried out. Only a small group were found which would accomplish the desired objectives. The present invention is based upon the concept of employing a coating composition wherein the admixed materials have different swelling rates, so that when the dried coating is exposed to the moisture of the seed bed, there is a gradual swelling of the coating over a period of time, and this swelling continues after the hydration of the fastest swelling ingredient. The component having the slower rate of hydration continues to act as a binder during the hydration and swelling of the faster swelling component. This interplay of the forces generated causes one component to expand whereas the other component restrains the coating to insure that the coating will open or expand much like the opening of petals of a flower and then will fall away from the seed rather than merely swelling and staying in place. In this manner, the underlying seed is exposed to moisture, air, and light shortly after being planted. This contrasts with conventional coatings which remain on the seed after planting to shield the seed from light and air for a longer time.

The coating composition according to this invention is preferably applied as an aqueous dispersion comprising a combination of selected minerals. The composition can be applied to celery seed using any of the well known coating processes. One such process in use today is known as the Wurster Air Suspension Coating Process and is fully described in U.S. Pat. Nos. 2,799,241; 3,089,824; 3,117,027; 3,196,827; 3,207,824; 3,241,520 and 3,253,994. Seed coated with the present composition yielded seeds having a high percentage germination and uniform germination time.

A large number of minerals and binder materials were evaluated. Certain materials provided a size buildup but without the ability to "flower." Unexpectedly, only certain materials, when combined, possess the requisite size buildup and unique hydration characteristic, which cause swelling over a protracted period of time in a manner causing the coating to open to expose the seed.

Compositions found to be effective comprise a combination of mineral substances, the major constituent being amorphous silica. A low viscosity suspending agent, preferably montmorillonite clay and a gelling and thickening agent, e.g., magnesiumaluminum silicate are employed with the silica.

Amorphous silica is employed in the present composition in a major amount, e.g., 50% or more. The amorphous silica is nonhydrophilic with a particle size below 200 mesh (Tyler screen). A variety of grades of amorphous silica are marketed by the Illinois Minerals Co. of Cairo, Ill. The preferred grade is designated "1160". Amorphous silica is described as a silica that has been deposited by an ancient sea and has been leached of all soluble alkalies leaving only the microcrystalline siliceous skelton. Generally, the mineral is mined and crushed to soft, snow-white particles. In the present invention it is preferred to use the air-floated grades which pass through a 200 mesh screen and having 92% of the particles being below 40 microns diameter. Other physical characteristics of this material include a specific gravity of about 2.65, an apparent density of 29–31 lbs/ft$^3$, and a pH of about 7.

The low viscosity suspending agent employed is preferably colloidal montmorillonite clay, generally present in a minor amount, e.g., preferably from about 5% to 30% by weight of the mixture. These clays have a very low iron content, with calcium and sodium being the major exchangeable cations. The preferred materials are microcrystalline and generally insoluble in water and organic solvents, do not gel, but disperse easily in water to form colloidal suspensions. Especially, preferreed is "Gelwhite L" produced by the Georgia Kaolin Company, Elizabeth, N.J., which is a white purified colloidal montmorillonite having a pH of about 8-9, at 2% aqueous dispersion.

The third essential ingredient employed is attapulgite, which is from the palygorskite group and is composed of a complex magnesium aluminum silicate for use as a gelling and thickening agent. This mineral is acidular shaped and has an average particle size of 0.14 microns and a pH value of about 7.5 to 9.5. This ingredient is generally employed in a minor amount, from about 10% to 45% by weight of the mixture. The especially preferred gelling agent is "Attagel 50" sold by the Engelhard Mineral and Chemical Company of Edison, N.J.

The coating composition of the present invention are determined by evaluationg the critical parameters of germination and growth rate of a broad range of ingredients. The resulting preferred proportion of each ingredient is shown hereinbelow.

| Ingredient | Preferred (Weight %) | Most Preferred (Weight %) |
|---|---|---|
| Silica | 50 – 80 | 53 – 60 |
| Montmorillonite | 5 – 30 | 7 – 20 |
| Attapulgite | 10 – 45 | 20 – 40 |

After the aforementioned ingredients are completely admixed, 2-7 parts by weight water is added per weight of solid ingredients. A high shear mixing is used to obtain dispersion, gelation and thickening of the minerals. The resulting composition is then applied to the seed by the Wurster process.

To assure uniform dispersion, gelation and thickening characteristics of each formulation, the apparent viscosity of the suspension was controlled. Viscosity measurements were obtained at a temperature of between 70° and 75°F using the Brookfield Viscometer Model RVF using No. 6 spindle at 20 rpms.

Having described this invention in its general terms, the following examples are presented to show comparative and/or preferred embodiments of the seed coating composition, and the pelletized seed of the present invention. These examples are not meant to be limiting.

EXAMPLE 1

A. Coating Process

Celery seed was coated using a 4-inch truncated Wurster unit loaded with 500 grams of raw celery seed to be coated. An air atomizing nozzle at 20 psig was used to apply different coating compositions as shown in Table 1 which follows.

The seed is cycled in the Wurster equipment using approximately 25 cfm of process air heated to 195° to 205°F. The coating suspension is applied with a pump to the cycling seed at the rate of about 20 ml per minute or about 291 grams per hour. The time required to apply the coating depends upon the particle size desired. During the coating operation the process air temperature is maintained at 195° to 205°F, the outlet air temperature being kept to about 90° to 105°F so that the seed is not overheated. An equilibrium is maintained during the coating process between the application rate of the coating suspension and the process temperature.

The size of the coated seed is desirably kept within limits to give proper planting size and adequate strength. The desired size of the coated or pelletized seed is between 4.5/64 and 5.5/64 inches, with the preferred size being 5.0/64 inch. The coated seeds are screened with undersize particles returned to the coating process and the larger particles further screened to the preferred size range.

B. Coating Compositions

In Table I, shown hereinbelow, there is presented a variety of compositions which were extensively evaluated for performance and physical characteristics.

TABLE I

| Composition | Ingredient (1) | Ingredient (2) | (% wt.) (3) | % Solids in Slurry | Apparent Viscosity (Centipoise×100) |
|---|---|---|---|---|---|
| A | 50 | 20 | 30 | 16.7 | 60 – 65 |
| B | 53 | 15 | 32 | 17.5 | 62 – 69 |
| C | 55 | 19 | 26 | 18.2 | 64 – 69 |
| D | 57 | 11 | 32 | 18.9 | 78 |
| E | 59 | 15 | 26 | 19.6 | 58 – 71 |
| F | 63 | 11 | 26 | 21.2 | 75 – 78 |
| G | 65 | 15 | 20 | 22.2 | 70 – 89 |
| H | 66 | 17 | 17 | 22.7 | 66 – 70 |
| I | 70 | 13 | 17 | 25.0 | 78 – 80 |
| J | 73 | 16 | 11 | 26.3 | 78 – 85 |

NOTES:
(1) Silica — grade 1160
(2) Montmorillonite — "Gelwhite L"
(3) Attapulgite — "Attagel 50"

EXAMPLE 2

Using the various compositions shown in Table 1, celery seeds were coated using the Wurster coating process of Example 1. The coated seeds were tested by germination under a variety of different planting systems and compared with raw seeds as shown in the following Table II.

TABLE II

| Standard Germination Vigor Index | Pellet Composition | Greenhouse under Mist % Germ 10 days | Pellet Composition |
|---|---|---|---|
| 1 | B | 75.6 | B |
| 2 | D | 72 – 75 | Raw seed |
| 3 | G | 61.1 | D |
| 4 | A | 50 | E |
| 5 | F | 40.9 | G |
| 6 | E | 31.9 | C |
| 7 | I | 30.5 | A |
| 8 | C | 28.4 | F |
| 9 | J | 18.7 | I |
| 10 | H | 15.2 | J |

TABLE II-continued

| Standard Germination Vigor Index | Pellet Composition | Greenhouse under Mist % Germ 10 days | Pellet Composition |
|---|---|---|---|
| | | 6.9 | H |

The vigor index is an arbitary performance rating of the pelleted compositions from 1 (best) to 10 (worst) in the standard germination test. As will be noted, the B coated seed had the best performance, comparable to raw seed but all the compositions A–J are acceptable.

The coated seeds were also tested for speed of germination under different conditions as set forth in Table III.

TABLE III

| Pellet Composition | Germinator | Greenhouse Mist | Greenhouse Sub-irrigation | Seedbed Overhead Irrigation | Seedbed Sub-irrigation | Mean |
|---|---|---|---|---|---|---|
| A | 5 | 7 | 11 | 6 | 7 | 7.2 |
| B | 2 | 1 | 2 | 2 | 1 | 1.6 |
| C | 9 | 6 | 8 | 7 | 9 | 7.8 |
| D | 3 | 3 | 4 | 3 | 3 | 3.2 |
| E | 7 | 4 | 3 | 5 | 4 | 4.6 |
| F | 6 | 8 | 7 | 8 | 8 | 7.4 |
| G | 4 | 5 | 5 | 4 | 6 | 4.8 |
| H | 11 | 11 | 10 | 11 | 11 | 10.8 |
| I | 8 | 9 | 9 | 10 | 10 | 9.2 |
| J | 10 | 10 | 6 | 9 | 5 | 8.0 |
| Raw seed | 1 | 2 | 1 | 1 | 2 | 1.4 |
| Asgrow* 683 | 12 | 12 | 12 | 12 | 13 | 12.2 |
| Germain** 2-14 | 13 | 13 | 13 | 13 | 12 | 12.8 |

NOTES:
Ratings based on 1–13 from the fastest to slowest.
Germinator temperature 25°C for 8 hrs., 15°C for 16 hrs., lights during 8 hr. period.
Greenhouse mist operating 20 sec. each, 10 min. from 9 AM to 4 PM.
*Asgrow 683 coated seed: Asgrow Seed Company, Lite-Coat Branch 211 Ivy Street, Salinas, California 93901
**Germain 2-14 coated seed: Germain's Inc., Processed Seed Division P. O. Box 3233, Los Angeles, California 90051

From the foregoing examples it is clear that the coated seed according to the present invention compares favorably to raw seed and is superior in virtually all respects to the conventional coated seed with regard to such tests including germinator, greenhouse mist, greenhouse subirrigation, open seedbeds with overhead irrigation and open seedbeds with subirrigation.

The improved speed of germination and germination percentage in days after planting are also important since a greater uniformity of plants is obtained when germination occurs in the first 10–20 days. Tests conducted show the following germination characteristics of coated seed versus raw seed planted on blotters under alternating temperature of 15°–25°C. The values given in Table IV are termed Germination Speed Index (GSI), which is based on a well known relationship between the number of seeds that germinate and the number of days after planting that corresponds to the number of seeds germinated. This relationship is known to those familiar with germination characteristics of seeds, see, F. Kotowski, American Society for Horticulture Science, at 176–184 (Vol. 23, 1926).

TABLE IV

| Composition | GSI | Control (Raw Seed) GSI |
|---|---|---|
| A | 9.16 | 9.88 |
| B | 10.11 | 10.81 |
| C | 8.62 | 9.94 |
| D | 9.23 | 9.55 |
| E | 8.98 | 9.88 |
| F | 9.04 | 9.80 |
| G | 9.17 | 10.05 |
| H | 8.51 | 9.48 |
| I | 8.95 | 10.02 |
| J | 8.57 | 9.94 |

While the values hereinabove given are for celery seed, it will be apparent that the present process and composition can be applied to other seeds, and that for different plants different size pellets may be necessary.

It has been found that the pelletized seed according to this invention yielded improved performance over conventionally coated seeds.

The characteristics of the present coating exposed the seed to air, moisture and light by the coat cracking and opening in a blossoming manner similar to a flower. This appeared to be a key factor in comparison to other pelletizing processes. Thus, coated seeds can be placed on the surface of a moist blotter and fissure cracks appear in 30 seconds followed by complete exposure of the seed. Moreover, the speed of germination and germination percents in days after planting are also outstanding. It is important for the germination to be concentrated in the first 10 to 12 days so as to obtain uniformity of plants even though a high percent of the plants may ultimately germinate within a 20 day period. Other major characteristics were determined which were not observed in other commercial pelletized seed:

1. Seed coated according to this invention, when stored under at least three different temperature conditions for three months resulted in no significant loss in speed or percent of germination.

2. Seed coated according to this invention compared to raw seed could be planted in soil depths of ⅛ inch, ¼ inch and ⅜ inch without any statistical differences.

3. Celery coated to the specified size range, was oval shape capable of being readily handled by mechanical devices.

What is claimed:

1. A seed coated with an inorganic coating material which opens to expose the underlying seed when subjected to moisture, said coating composition comprising at least 50% by weight of an amorphous silica, the remainder including at least about 5% by weight montmorillonite and at least about 10% by weight attapulgite.

2. The coated seed according to claim 1 wherein the seed is from the family Umbelliferae and requires light for germination.

3. A coated seed according to claim 2 wherein the seed is celery.

4. A coated seed according to claim 1 wherein said composition comprises from about 50% to about 80% amorphous silica, from about 5% to about 30% colloidal montmorillonite, and from about 10% to about 45% attapulgite, said coating having a pH ranging from about 7.5 to about 9.5.

5. A coated seed according to claim 1 wherein said composition comprises from about 53% to about 60% amorphous silica, from about 7% to about 20% colloidal montmorillonite clay and from about 20% to about 40% attapulgite.

6. A coated seed according to claim 1 wherein said composition comprises 53% amorphous silica, 15% colloidal montmorillonite clay and 32% attapulgite mineral.

7. A seed coating composition which, when dried, will flower in the presence of moisture to expose the underlying seed to moisture, air and light, said composition consisting essentially of an admixture of at least 50% by weight amorphous silica, at least 5% by weight colloidal montmorillonite clay, and at least 10% by weight attapulgite mineral, said composition having a pH value in the range of about 7.5 to 9.5.

8. A seed coating composition according to claim 7 wherein said coating composition comprises from about 50% to about 80% amorphous silica, from about 5% to about 30% colloidal montmorillonite, and from about 10% to about 45% attapulgite, said coating having a pH ranging from about 7.5 to about 9.5.

9. a seed coating composition according to claim 7 wherein said composition comprises from about 53% to about 60% amorphous silica, from about 7% to about 20% colloidal montmorillonite clay, and from about 20% to about 40% attapulgite.

10. A seed coating composition according to claim 7 wherein said composition comprises 53% amorphous silica, 15% colloidal montmorillonite clay, and 32% attapulgite mineral.

11. A seed coating composition according to claim 7 wherein water is added to said admixture in an amount of 2–7:1 to form a dispersion.

* * * * *